United States Patent [19]

Boltz, Jr.

[11] 3,864,733

[45] Feb. 4, 1975

[54] CONTROL SIGNAL APPARATUS FOR VIDEO DISC PLAYER

[75] Inventor: Charles D. Boltz, Jr., Greenwood, Ind.

[73] Assignee: RCA Corporation, New York, N.Y.

[22] Filed: Mar. 19, 1973

[21] Appl. No.: 342,374

[30] Foreign Application Priority Data

Apr. 19, 1972 Great Britain .................... 18041/72

[52] U.S. Cl. ................ 360/33, 178/6.6 DD, 360/38

[51] Int. Cl. .............................................. H04n 5/78

[58] Field of Search .................. 178/6.6 DD, 6.6 FS; 340/174.1 B, 174.1 H; 179/100.2 MD, 179/100.2 S; 360/27, 33, 38

[56] References Cited

UNITED STATES PATENTS

| | | | |
|---|---|---|---|
| 2,214,482 | 9/1940 | Schmidt | 179/100.4 D |
| 2,288,000 | 6/1942 | Kelly | 179/100.4 D |
| 2,679,553 | 5/1954 | Ruiz | 179/100.4 D |
| 3,576,573 | 4/1971 | Symons | 340/174.1 B |
| 3,588,855 | 6/1971 | Scully | 340/174.1 B |
| 3,601,799 | 8/1971 | Maerone et al. | 340/174.1 B |
| 3,614,309 | 10/1971 | Presri | 178/6.6 DD |
| 3,646,259 | 2/1972 | Schuller | 179/100.4 D |
| 3,711,641 | 1/1973 | Palmer | 178/6.6 DD |

*Primary Examiner*—Vincent P. Canney
*Attorney, Agent, or Firm*—E. M. Whitacre; S. Siegel; W. H. Meagher

[57] ABSTRACT

Apparatus arranged to detect the absence of periodically recurring signals such as vertical synchronizing signals in a video disc system is utilized to provide control signals for actuating control functions such as the video pick-up arm return mechanism and video and audio muting circuitry.

15 Claims, 2 Drawing Figures

CONTROL SIGNAL APPARATUS FOR VIDEO DISC PLAYER

This invention pertains to apparatus for detecting the presence of absence of periodically recurring signals indicative of the presence or absence of information on a record medium and for activating or de-activating apparatus for extracting information from this record medium.

In particular, the invention relates to a video disc reproducing system wherein the presence and absence of signals such as vertical synchronizing signals are detected to provide control signals for activating functions such as a video pick-up arm return mechanism and video and audio muting circuitry.

In prior art systems, particularly audio record players, end-of-play of the record or disc is sensed by, for example, velocity trip mechanisms, pick-up arm position detecting mechanisms or cueing signals on the inner-most convolutions of the disc. These systems have proven to be suitable in the audio recording art where the pick-up arm of the player is free to pivot or where the position of the arm is well defined with respect to the end of the information recorded on the disc. However, these requisites generally do not exist in video disc players and, in that case, other schemes for sensing end of disc play must be employed.

In a system employing a velocity trip mechanism, for example, a pick-up arm follows a relatively high-pitched information groove until reaching the end of the recorded information. Upon reaching this position, a second groove having a much lower pitch carries the pick-up arm towards the center of the disc at a relatively rapid velocity. The change in velocity from the high-pitched groove to the low-pitched groove at the end of record play trips a return mechanism causing the arm to be repositioned in the neutral or rest position on the side of the record player.

The velocity trip type of end-of-record-play mechanism is generally unsuitable in a video disc player. Video discs typically have a groove pitch of about 2,000 to 8,000 convolutions per inch, resulting in very close spacing between adjacent groove convolutions. This close spacing, typically 6 microns, militates against the use of a freely pivoting pick-up-arm. Pick-up arms that freely pivot have great difficulty in tracking closely spaced groove convolutions and require, for groove tracking purposes, that the pick-up arm be mechanically positioned by a tightly controlled positioning mechanism to anticipate groove location. Such a tightly controlled arm positioning mechanism is not free to respond to a change in groove pitch and therefore is unsuitable for utilizing the velocity trip mechanism as described above.

Pick-up arm position detectors, when used to determine end of disc play, typically utilize a magnetic pick-up or photoelectric detector for determining when the pick-up arm has reached a predetermined position on the record. In the use of such a system, when the pick-up arm arrives at a position which is near the end of record play, a magnetic or photoelectric sensing device energizes circuitry to activate the pick-up arm return mechanism. This type of arm return scheme has inadequacies in both the audio and video recording art. In either system there is no positive determination that the end of record play has been reached.

The third system mentioned above for determining end of record play utilizes a cueing signal. In such a system, a high frequency tone or coded signal is recorded in a portion of the last few spiral convolutions on the record disc. When the record disc is played and the cueing signal is reached, circuitry in the player designed to decode this high frequency tone or coded signal operates a mechanism to return the pick-up arm to its neutral or rest position. This system has the disadvantage of requiring that a special signal be recorded on the record and further requires additional decoding circuitry in the record player for operating in response to the end-of-play signal.

At the end of video disc play and prior to it, when the stylus in the pick-up arm is not recovering signal information, noise is received and produced in the sensitive video signal pick-up circuitry. If such noise is passed to the output channel of the video disc player, and then to the video monitor, such noise will create an undesirable pattern on the screen of the monitor and cause the audio circuitry of the monitor to produce a hissing sound. These video and audio noises resulting when the pick-up arm is not deriving information from the video disc are subjectively objectionable and it is desirable to eliminate them.

A system that provides control signals in response to an absence of extracted signal information from a storage medium, suitable for operating a signal pick-up arm return mechanism and for muting a signal information channel comprises apparatus for providing electrical signals from a storage medium having signals, including varying image-representative components and regularly recurring components, formed in a spiral pattern in this medium. A means for separating the image-representative components from the regularly recurring components provides an output of regularly recurring components. Detecting means responsive to predetermined ones of the regularly recurring signal components provides control signals representative of the presence or absence of these predetermined ones. Control means are coupled to this detecting means for inhibiting operation of the electrical signal-providing apparatus in response to absence-representative control signals.

A particular embodiment for practicing the above-summarized invention utilizes the presence or absence of the synchronizing signal components of a composite video signal provided from an information storage medium, such as a video disc, for producing the above-mentioned control signals. Signals such as vertical or horizontal sync are particularly suited for providing control signals since these signals are recorded throughout the information carrying area of the video disc at a relatively constant amplitude and uniform rate. The well-defined sync information is also available during the video disc's lead-in convolutions when video information is absent. During lead-in time, sync information is provided on the record for purposes of synchronizing video disc player control systems. Availability of sync signals during this lead-in time provides a convenient signal for disengaging the video muting circuitry prior to receipt of the disc's video information. The vertical sync signal is particularly appropriate as a control signal in view of its long, relatively noise-free duration. A system suitable for providing the above-described control signals therefore may utilize the detected presence or absence of a periodic pulse such as the vertical sync.

Figure 1:
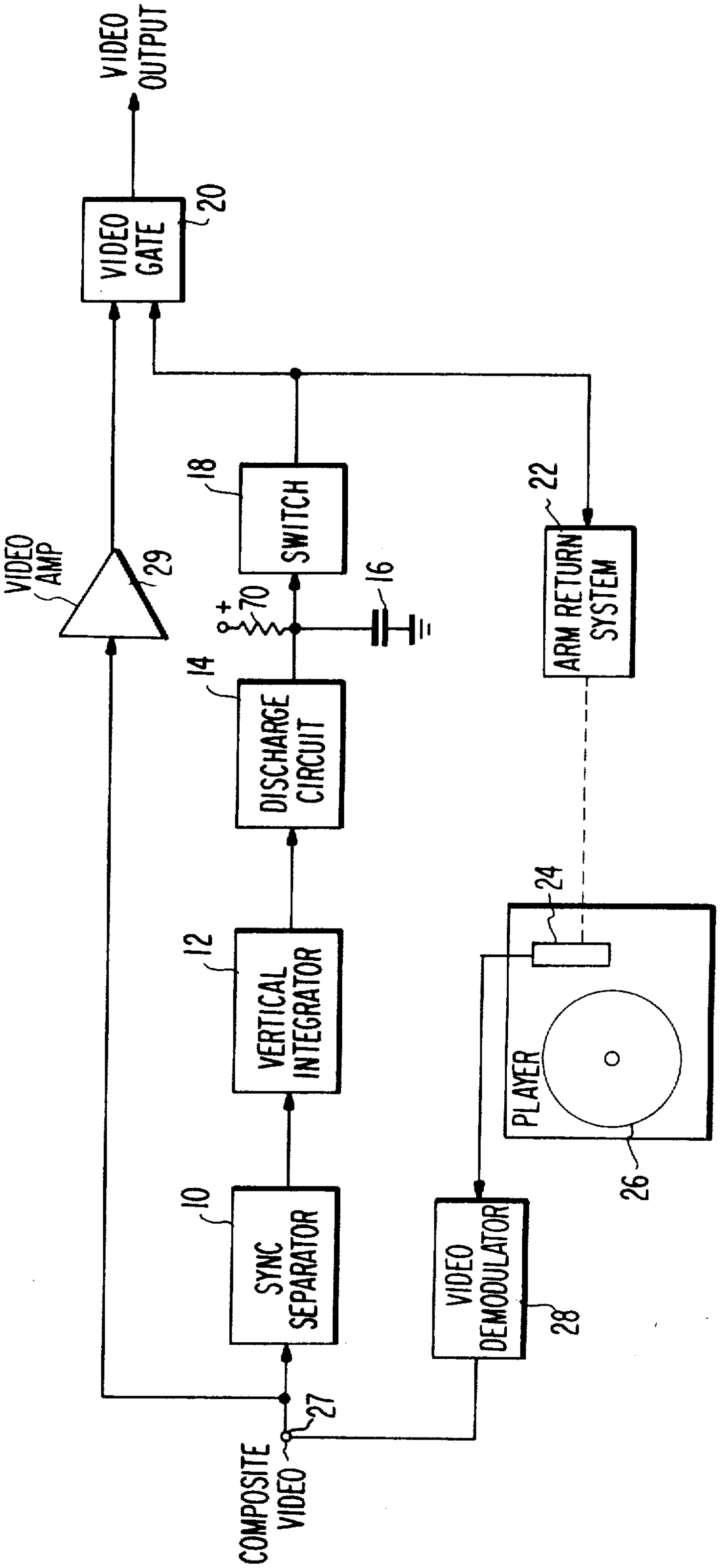
FIG. 1 is a block diagram of a portion of a system for reproducing video from a video disc and including a control signal generating circuit embodying the invention.

In FIG. 1, a video disc player and portions of the associated control circuitry are shown. Suitable apparatus of this type is shown in greater detail in U.S. Pat. Application Ser. No. 126,772, filed Mar. 22, 1971, in the name of Jon K. Clemens, which application is assigned to the same assignee as the present application. In such a player, a disc having a spiral groove in which image-representative signals are encoded is mounted on a turntable 26. A movable pick-up arm 24, suitable for riding in the spiral groove and for converting topographical variations in the groove into electrical signals is provided. Signal information decoded from the video disc, including audio- and video-representative components are reconstructed into a composite broadcast format, (such as the NTSC signal format) in demodulator 28. This composite video signal is coupled to a sync separator 10 and a video amplifier 29. Repetitive components of the composite video signal, particularly the vertical and horizontal sync, are separated from the composite video signal in sync separator 10 and are coupled to vertical integrator 12. Vertical integrator 12 is relatively unresponsive to the short duration horizontal sync pulses and an output responsive to only the longer duration vertical sync pulses is produced. The vertical sync-representative signal from vertical integrator 12 is then coupled to a discharge circuit 14 which, in turn, is coupled to a capacitor 16. Capacitor 16 charges via a resistor 70 in the absence of vertical sync signals and the resulting voltage operates to control a switch 18. During an absence of, for example, four vertical sync signals, capacitor 16 charges to a level sufficient to turn on switch 18. Conversely, in the presence of vertical sync, discharge circuit 14 shunts capacitor 16 to ground inhibiting operation of switch 18.

Switch 18 is a threshold device responsive to the voltage level across capacitor 16 and is operative to provide control signals. A video gate 20, responsive to control signals produced by switch 18, operates to pass or mute composite video signals passing through a video output channel including video amplifier 29. An arm return system 22 is also responsive to control signals produced by switch 18 and is operative to return pick-up arm 24 to a neutral position at the end of play of video disc 26.

Figure 2:
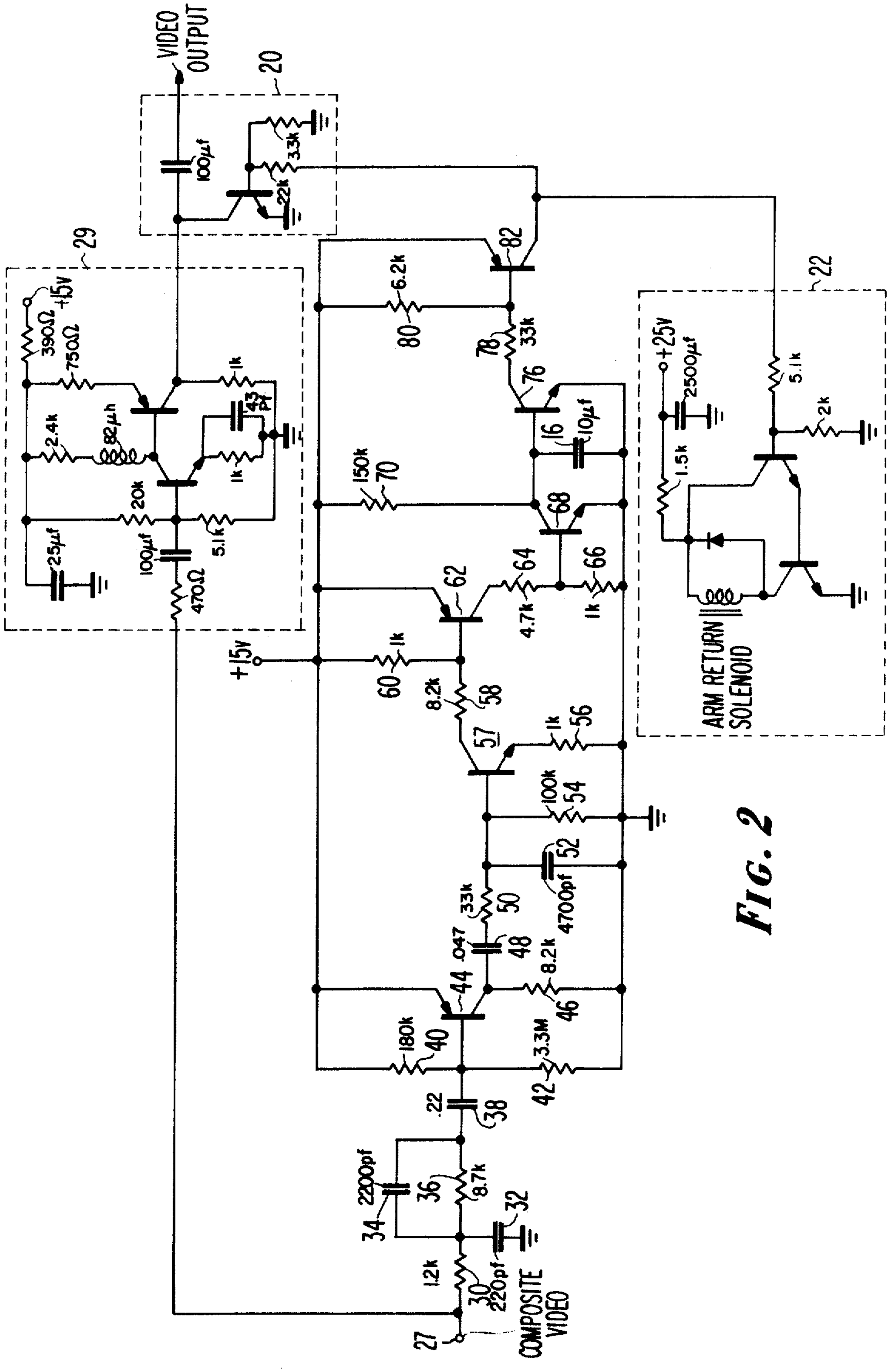
FIG. 2 is a typical schematic diagram of circuitry shown in block form in FIG. 1.

FIG. 2 illustrates a schematic drawing of circuitry suitable for providing functions described above with respect to FIG. 1. Composite video signals comprising varying image-representative components and regularly recurring components, particularly horizontal and vertical sync, are coupled from video demodulator 28 (FIG. 1) to terminal 27. In FIG. 2, the composite video signal appearing at terminal 27 is coupled to a low pass filter comprised of a resistor 30 and a capacitor 32, wherein unwanted noise spikes in the composite video signal are eliminated. The parallel combination of a resistor 36 and a capacitor 34 is coupled to the junction of resistor 30 and capacitor 32. The resistor-capacitor combination 34, 36 provides high frequency peaking to the remaining composite video signal. The composite video signal is then coupled to a transistor 44 through a coupling capacitor 38. Resistors 40 and 42 are coupled in series between a voltage supply (e.g., +15 volts) and ground and provide at their junction a base bias voltage for transistor 44. The values of resistors 40 and 42 are selected to operate transistor 44 in the absence of input signals at the threshold of conduction, providing it with insufficient base current for any significant conduction. Composite video signals having negative-going horizontal and vertical sync components are coupled to transistor 44 through capacitor 38 and are clamped by the base-emitter rectifier of transistor 44 to a level about 0.6 volts below the +15 volt supply voltage.

A capacitor 48 couples the vertical and horizontal sync signals from the collector of transistor 44 to an integrating network composed of a resistor 50 and a capacitor 52. The time constant of this integrating network is adjusted in accordance with the current discharge through the base of a transistor 57 and a resistor 54 to be respensive to only the vertical sync signals. Vertical-sync-responsive signals appearing acroos capacitor 52 are direct coupled to the base of transistor 57. Transistor 57 is a common emitter amplifier having a series combination of resistors 58 and 60 coupled between the voltage supply and its collector, and a resistor 56 coupled between its emitter and ground. Signals coupled to transistor 57 are amplified and direct coupled to the base of transistor 62. Transistor 62 comprises an emitter coupled directly to the voltage supply, a base coupled to the junction of resistors 58 and 60, and a collector coupled to the series combination of resistors 64 and 66. Transistor 62 operates as a high gain amplifier providing relatively rectangular pulses to the base of a transistor 68 in response to vertical sync signals. Transistor 68 has an emitter coupled to ground, a base coupled to the junction of resistors 64 and 66, and a collector coupled to a resistor 70 and a capacitor 16. Positive sync pulses produced across resistor 66 by the conduction of transistor 62 cause transistor 68 to conduct, discharging charge stored on capacitor 16. Transistor 76 has an emitter coupled to ground, a base coupled to the junction of capacitor 16 and resistor 70, and a collector coupled to the voltage supply through a series combination of resistors 78 and 80. Voltage produced across capacitor 16 in the absence of vertical sync signals operates to turn transistor 76 on and conversely off in the presence of vertical sync. This switching action of transistor 76 functions to drive a second switching transistor 82. Transistor 82 has an emitter couupled to the voltage supply, a base coupled to the junction of resistors 78 and 80, and a collector coupled to video gate 20 and arm return system 22.

During video disc play, composite video signals are coupled to the base of transistor 44. The netative-going sync pulses associated with the composite video signals turn transistor 44 on, allowing vertical and horizontal sync signals substantially free of video information to appear across the collector load resistor 46. Horizontal and vertical sync signals are coupled to the integrating circuit including resistors 50, 54 and capacitor 52. The relatively low duty cycle of the horizontal sync pulses causes capacitor 52 to charge to a relatively low level and discharge thereafter through resistor 54 without reaching a voltage level adequate to cause conduction in transistor 57. Vertical sync pulses, having a relatively long duration, provide an adequate charging time to cause the voltage across capacitor 52 to reach a level sufficient to cause transistor 57 to conduct.

Conduction in transistor 57 causes conduction in each of transistors 62 and 68. Transistor 68 shunts capacitor 16 to ground in response to the presence of vertical sync pulses, preventing capacitor 16 from charging through resistor 70 to a level sufficient to cause transistor 76 to conduct. In the absence of vertical sync signals, capacitor 16 charges to about a 0.6 volt level through resistor 70. The charging time for capacitor 16 to reach the 0.6 volt level, the level at which it is clamped by transistor 76, is determined by the values of capacitor 16 and resistor 70 and the voltage supply (+15 volts). This charging time constant is typically adjusted to provide a voltage across capacitor 16 sufficient to turn on transistor 76 in a period of time equal to the absence of about four vertical sync pulses, or about 72 milliseconds. A turn-on time of about 72 milliseconds is utilized to prevent erroneous operation of the controlled circuitry in the event that a series of two or three vertical sync pulses are missing due to imperfection or drop-outs of the signals recorded on the video disc. When vertical sync is absent, for example, prior to or after video disc play, transistor 76 turns on into saturation, in turn causing transistor 82 to saturate and provide a +15 volt level at its collector. The +15 volt signal level provided at the collector of transistor 82 is a first level control signal and causes the grounded emitter transistor in video gate 20 to saturate, thereby inhibiting video signals from passing through gate 20. The associated video display device will therefore be prevented from displaying image-representative signals and also, if desired, equipment (not shown) for reproducing associated sound-representative signals also may be muted upon operation of gate 20.

At the same time, when transistor 82 saturates, the arm return system 22 is also activated to return the pick-up mechanism 24 (FIG. 1) to its rest position. This may be accomplished, for example, by activating an arm return solenoid (FIG. 2) or other device which is linked to the pick-up mechanism 24.

Hence, control signals developed in response to the presence or absence of vertical sync may be functionally utilized in a video disc player to control portions of the player apparatus such as audio and video muting circuitry and a pick-up arm return system.

What is claimed is:

1. A control system for an image reproducing system comprising:

apparatus for providing electrical signals representative of informtion stored in a spiral pattern on a storage medium, said signals including varying image-representative components and regularly recurring synchronizing components;

means for separating said image-representative and regularly recurring synchronizing components;

detecting means responsive to said regularly recurring synchronizing components for providing a first control signal in response to the presence of said synchronizing components and a second control signal in response to the absence of said synchronizing components for a predetermined length of time, said predetermined length of time being greater than the time required to provide a first control signal upon the appearance of said synchronizing components; and control means coupled to said detecting means for inhibiting operation of said electrical signal providing apparatus in response to said second control signal and permitting operation of said electrical signal providing apparatus in response to said first control signal.

2. A control system according to claim 1 wherein:

said storage medium is a disc having said image representative components and regularly recurring synchronizing components topographically recorded in a spiral pattern therein.

3. A control system according to claim 1 wherein:

said means for separating said image-representative components from said regularly recurring synchronizing components comprises circuitry substantially unresponsive to said image-representative components and responsive for providing predetermined ones of said regularly recurring synchronizing components.

4. A control system according to claim 1 wherein:

said detecting means comprises circuitry including an integrator circuit responsive to a particular regularly recurring synchronizing component having a relatively long time constant, said particular regularly recurring synchronizing component bening operative to provide control signals.

5. A control system according to claim 4 wherein:

said particular regularly recurring synchronizing component corresponds to a vertical synchronizing signal and said predetermined length of time corresponds to the interval required for three to eight consecutive vertical synchronizing pulses.

6. A control system according to claim 1 wherein:

said apparatus comprises a video signal processing channel; and said control means comprises a first means for permitting passage of said electrical signals through said video channel in response to said first control signal and second means for inhibiting said electrical signal providing apparatus in response to said second control signal.

7. A control system according to claim 6 wherein:

said apparatus further comprises a signal pick-up arm arranged to receive electrical signals from said storage medium; and said second means disengages said pick-up arm from said storage medium, inhibiting electrical signal pick-up in response to said second control signal.

8. A control system for an image reproducing system comprising:

apparatus for providing electrical signals representative of video information from a disc having said signal representative information formed therein, said signal representative information including image representative components and regularly recurring synchronizing components;

means for separating said regularly recurring synchronizing components from said image representative components;

means for detecting said regularly recurring synchronizing components for providing a first control signal in response to the presence of said synchronizing components and a second control signal in response to the absence of said synchronizing components for a predetermined length of time, said predetermined length of time being greater than the time required to provide a first control signal upon the appearance of said synchronizing components; and control means coupled to said apparatus and responsive to said second control signal for inhibiting output of electrical signals from said apparatus.

9. A control system according to claim 8 wherein:

said apparatus includes a pick-up arm operating in concert with said disc for detecting signal information on said disc; and said control means is coupled to said pick-up arm for inhibiting detection of said signal information.

10. A control system according to claim 8 wherein:

said regularly recurring synchronizing components correspond to vertical synchronizing signals.

11. A control system according to claim 8 wherein:

said apparatus includes a video output channel for providing said electrical signals; and said control means is operative upon said video output channel to permit output of signals from said video output channel in response to first control signals.

12. A control system for an image reproducing system comprising:

apparatus for recovering electrical signals including varying image representative components and synchronizing components from information stored on a disc record;

detecting means for providing a first control signal in response to the presence of said synchronizing components and a second control signal in response to an absence of said synchronziing components for a predetermined length of time, said predetermined length of time being greater than the time required to provide a first control signal upon the appearance of said synchronizing components; and control means responsive to said second control signal for disabling said apparatus.

13. Apparatus according to claim 12 wherein said predetermined length of time corresponds to the interval required for three to eight consecutive synchronizing signals.

14. A control system for an image reproducing system comprising:

a signal pick-up arm arranged for detecting signal information including image representative components and synchronizing components recorded on a disc record;

means responsive to particular ones of said synchronizing components for providing a first control signal indicative of the presence of said particular synchronizing component and a second control signal in response to the absence of said particular synchronizing component for a predetermined length of time, said predetermined length of time being greater than the time required to provide a first control signal upon the appearance of said synchronizing component; and control means coupled to said pick-up arm for disengaging signal pick-up by said arm in response to said second control signal.

15. The apparatus of claim 14 including signal separating means coupled to said pick-up arm for separating particular ones of said synchronizing components from others of said signal information; and delay means interposed between said responsive means and said control means for providing a predetermined delay to actuation of said control means.

* * * * *